(12) United States Patent
Choi et al.

(10) Patent No.: US 10,366,044 B2
(45) Date of Patent: Jul. 30, 2019

(54) PCIE DEVICE FOR SUPPORTING WITH A SEPARATE REFERENCE CLOCK WITH INDEPENDENT SPREAD SPECTRUM CLOCKING (SSC)(SRIS)

(71) Applicant: Samsung Electronics Co., Ltd., Suwon-si, Gyeonggi-do (KR)

(72) Inventors: Kwang Hee Choi, Seoul (KR); Dae Sik Park, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 180 days.

(21) Appl. No.: 15/489,125

(22) Filed: Apr. 17, 2017

(65) Prior Publication Data

US 2017/0315956 A1    Nov. 2, 2017

(30) Foreign Application Priority Data

May 2, 2016    (KR) .................... 10-2016-0054256

(51) Int. Cl.
*G06F 13/42*    (2006.01)
*G06F 1/26*    (2006.01)

(52) U.S. Cl.
CPC .......... *G06F 13/4291* (2013.01); *G06F 1/266* (2013.01); *G06F 2213/0026* (2013.01); *Y02D 10/14* (2018.01); *Y02D 10/151* (2018.01)

(58) Field of Classification Search
CPC ................................................ G06F 13/4291
See application file for complete search history.

(56) References Cited

U.S. PATENT DOCUMENTS

| | | |
|---|---|---|
| 6,128,682 A | 10/2000 | Humpherys et al. |
| 6,931,563 B2 | 8/2005 | Urita |
| 7,343,498 B2 | 3/2008 | Morrow |
| 8,166,334 B2 | 4/2012 | Lai et al. |
| 8,559,582 B2 | 10/2013 | Hoang |
| 8,949,502 B2 | 2/2015 | McKnight et al. |
| 8,984,322 B2 | 3/2015 | Senohrabek et al. |
| 10,101,764 B2 * | 10/2018 | Chou ................ G06F 1/12 |
| 2014/0244889 A1 | 8/2014 | Sasson |
| 2017/0212579 A1 * | 7/2017 | Tirumala .......... G06F 1/3287 |

* cited by examiner

*Primary Examiner* — Tammara R Peyton
(74) *Attorney, Agent, or Firm* — Harness, Dickey & Pierce, P.L.C.

(57) ABSTRACT

A PCIe device for supporting SRIS includes a transceiver, a clock signal generator configured to generate a second reference clock signal, a connector in a structure to be connected to a PCIe host, and a selection circuit configured to determine whether a first reference clock signal is supplied through the connector and transmit one of the first reference clock signal and the second reference clock signal to the transceiver according to a result of the determination.

18 Claims, 7 Drawing Sheets

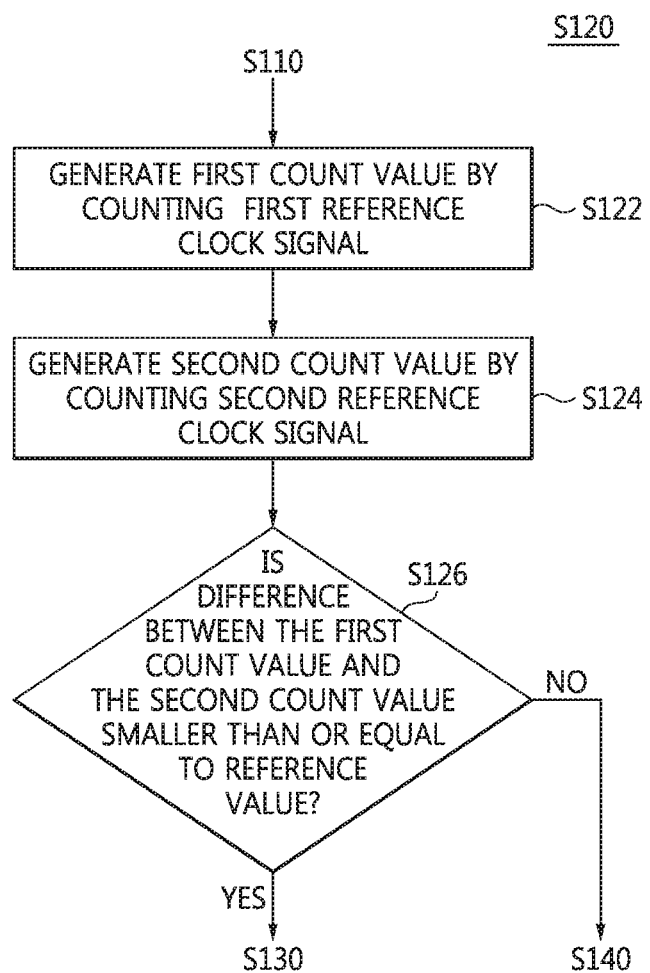

PCIE DEVICE FOR SUPPORTING WITH A SEPARATE REFERENCE CLOCK WITH INDEPENDENT SPREAD SPECTRUM CLOCKING (SSC)(SRIS)

CROSS-REFERENCE TO RELATED APPLICATION

This U.S. non-provisional application claims the benefit of priority under 35 U.S.C. § 119(a) from Korean Patent Application No. 10-2016-0054256, filed on May 2, 2016 in the Korean Intellectual Property Office (KIPO), the disclosure of which is incorporated herein by reference in its entirety.

BACKGROUND

Various example embodiments of the present inventive concepts relate to a peripheral component interconnect express (PCIe) device, and more particularly, to a PCIe device for supporting a separate reference clock with independent spread spectrum clocking (SSC) (SRIS), which can automatically select one reference clock signal output from several different clock sources as an operating clock signal.

In general, a reference clock signal with a frequency of 100 MHz is used in a PCIe system including a PCIe host and a PCIe device. A method of supplying the reference clock signal can be classified into a common referenced clock signal method and an individual reference clock signal method.

The common reference clock signal method is a method in which a PCIe device and a PCIe host share one reference clock source, the reference clock source being embodied in the PCIe host. In the common reference clock signal method, a reference clock signal is generated by the reference clock source and is supplied to the PCIe device through a PCIe connector. A pin for supplying the reference clock signal is required to be assigned in the PCIe connector.

The individual reference clock signal method is a method in which a PCIe device and a PCIe host each have different reference clock sources, respectively, and the reference clock sources of the PCIe device and the PCIe host each generates a respective reference clock signal to be used in operation by the corresponding PCIe device or the PCIe host. In this case, the PCIe device and the PCIe host may be connected to each other using a PCIe cable, or the like, and the PCIe cable does not require a pin for supplying a reference clock signal.

SUMMARY

At least one example embodiment of the present inventive concepts is directed to a peripheral component interconnect express (PCIe) device for supporting a separate reference clock with independent spread spectrum clocking (SSC) (SRIS), including a connector in a structure to be connected to a PCIe host and configured to receive a first reference clock signal from the PCIe host, a clock signal generator configured to generate a second reference clock signal, and a selection circuit configured to determine whether the first reference clock signal is being supplied through the connector, and transmit one of the first reference clock signal or the second reference clock signal to a transceiver based on the determination.

At least one example embodiment of the present inventive concepts is directed to a peripheral component interconnect express (PCIe) device for supporting a separate reference clock with independent spread spectrum clocking (SSC) (SRIS), including a clock signal generator configured to generate the second reference clock signal, and a physical layer configured to automatically detect whether the first reference clock signal is supplied from the PCIe host and select the first reference clock signal or the second reference clock signal as a main reference clock signal of the PCIe device according to a result of the detection.

At least one example embodiment of the present inventive concepts is directed to a peripheral component interconnect express (PCIe) device for supporting a plurality of clock signals, including a device clock generator configured to generate a device clock signal, a selection circuit configured to receive a plurality of clock signals, the plurality of clock signals including an external clock signal received from a PCIe host and the device clock signal, generate a result based on the plurality of clock signals and transmit a reference clock signal based on the generated result, the reference clock signal being selected from the plurality of clock signals, and a transceiver configured to communicate PCIe data to another PCIe device using the transmitted reference clock signal.

BRIEF DESCRIPTION OF THE DRAWINGS

These and/or other aspects and advantages of the present general inventive concepts will become apparent and more readily appreciated from the following description of the example embodiments, taken in conjunction with the accompanying drawings of which:

FIG. 7 is a flowchart for specifically describing a determination step shown in FIG. 6 according to at least one example embodiment of the present inventive concepts.

DETAILED DESCRIPTION

Figure 1:
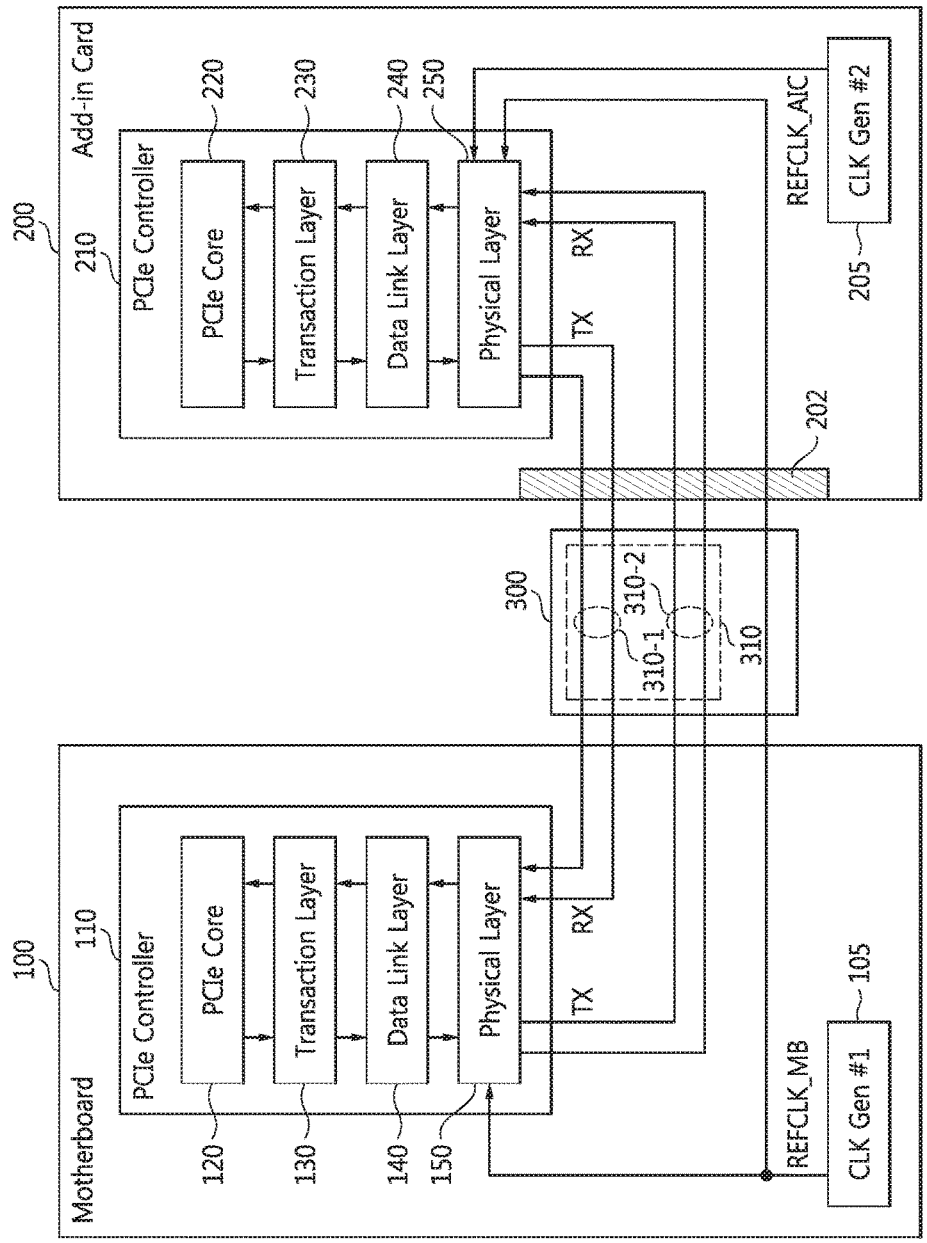
FIG. 1 is a block diagram which shows a schematic configuration of a PCIe system according to at least one example embodiment of the present inventive concepts.

FIG. 1 is a block diagram which shows a schematic configuration of a PCIe system according to example embodiments of the present inventive concepts. Referring to FIG. 1, a PCIe system 50 (e.g., a computer system that includes a PCIe interface) may include a PCIe host 100, a PCIe device 200, and a PCIe interface 300 which provides a connection between the PCIe host 100 and the PCIe device 200, but the example embodiments are not limited thereto. For example, while only a single PCIe host and a single PCIe device is depicted in FIG. 1, the example embodiments are not limited thereto and there may be any combination of PCIe hosts and/or PCIe devices in the PCIe system 50.

The PCIe host 100 may be a computing device which generates a first reference clock signal REFCLK_MB and supplies the first reference clock signal REFCLK_MB to the PCIe device 200 and/or a motherboard of the computing device. The computing device may be a personal computer (PC), a laptop computer, a tablet, a mobile computing device, a smart device, etc.

The PCIe device 200 may be connected to the PCIe host 100 through the PCIe interface 300, and may use the first reference clock signal REFCLK_MB supplied from the PCIe host 100, or a second reference clock signal REFCLK_AIC generated in the PCIe device 200, as a reference clock signal. The PCIe device 200 may support a separate reference clock with independent spread spectrum clocking (SSC) (SRIS).

The PCIe device 200 may be an expansion card, an expansion board, an adapter card, an add-in card, an accessory card, a peripheral device, etc., and may include a printed circuit board (PCB) which can be inserted into an electric connector (e.g., a PCIe interface connection) and/or an expansion slot on a motherboard of the PCIe host 100 to provide an additional function to the PCIe system 50 (and/or a computer system) through the PCIe bus (e.g., an expansion bus). In addition, the PCIe device 200 may also be a storage device such as a solid state drive (SSD), a graphics card, a network card, a USB card, etc.

The PCIe host 100 may include a first clock signal generator 105 and the PCIe host controller 110, but is not limited thereto. The first clock signal generator 105 and the PCIe host controller 110 may be installed on a motherboard, but are not limited thereto. The PCIe host controller 110 may include a PCIe core 120, a transaction layer 130, a data link layer 140, and a physical layer 150, etc.

The PCIe device 200 may include a connector 202, a second clock signal generator 205, and a PCIe device controller 210, but is not limited thereto. The PCIe device controller 210 may include a PCIe core 220, a transaction layer 230, a data link layer 240, and a physical layer 250, etc.

PCIe layers include three discrete logical layers, i.e., the transaction layer 130 or 230, the data link layer 140 or 240, and the physical layer 150 or 250. Each of the layers 130 or 230, 140 or 240, and 150 or 250 is divided into two sections. The transmission section TX processes outbound information (e.g., information to be transmitted) and the receiving section RX processes inbound information (e.g., information to be received).

The PCIe protocol uses packets for communicating information between various components, such as PCIe host 100 and PCIe device 200.

According to the protocol stack of the PCIe protocol, an upper layer is the transaction layer 130 or 230. Primary responsibilities of the transaction layer 130 or 230 are to assemble and to disassemble transaction layer packets (TLPs). The TPLs are used to communicate transactions.

In the PCIe protocol stack, the middle layer is the data link layer 140 or 240. The data link layer 140 or 240 serves as an intermediate stage between the transaction layer 130 or 230 and the physical layer 150 or 250. The primary responsibilities of the data link layer 140 or 240 are link management and data integrity including error detection and error correction.

A transmission side (e.g., transmission section) of the data link layer 140 or 240 accepts TLPs assembled in the transaction layer 130 or 230, calculates and applies a data protection code and a TLP sequence number, and transmits the data protection code and the TLP sequence number to the physical layer 150 or 250 for transmission through at least one link (e.g., link 310) included in the PCIe interface 300.

A receiving side (e.g., receiving section) of the data link layer 140 or 240 checks the data integrity of the received TLPs and submits the TLPs to the transaction layer 130 or 230 for additional processing.

The physical layer 150 or 250 includes the circuitry for a physical interface operation. The physical layer circuitry includes a driver, an input buffer, a serial-parallel conversion circuit, a parallel-serial conversion circuit, a phase locked loop (PLLs), and an impedance matching circuit. The physical layer 150 or 250 also includes logical functions related to the initialization and maintenance of the PCIe interface.

The PCIe interface 300 includes at least one link 310 which includes first transmission lines 310-1 and second transmission lines 310-2 for transmitting packets.

The PCIe host 100 includes the first clock signal generator 105 for generating a first reference clock signal REFCLK_MB, which is supplied to at least the physical layer 150 and the PCIe interface 300. The PCIe core 120 may generally control the PCIe host controller 110. The PCIe core 220 may generally control the PCIe device controller 210.

According to some example embodiments of the present inventive concepts, the circuitry described in reference to FIGS. 2 to 7 relates to a novel physical layer 250 (e.g., physical layer 250B) of the PCIe device controller 210 that supports a plurality of reference clock sources and can automatically select one reference clock signal output from the plurality of reference clock sources as an operating clock signal of the PCIe device 200. Accordingly, a structure and functions of the circuits of the physical layer 250 according to some example embodiments of the present inventive concepts will be described in detail as follows.

Figure 2:
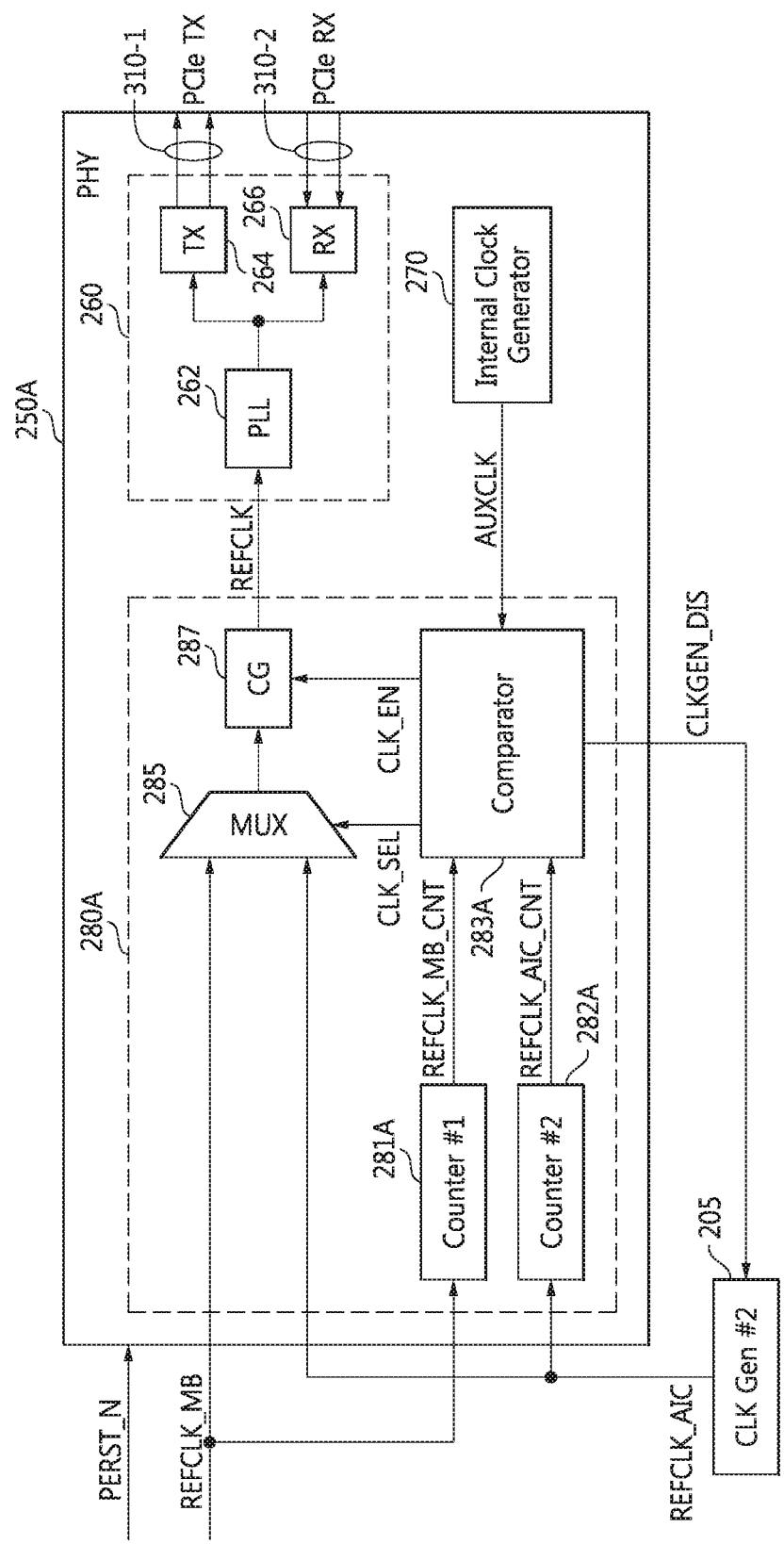
FIG. 2 is a block diagram which shows circuits embodied in a physical layer of the PCIe device shown in FIG. 1 according to at least one example embodiment of the present inventive concepts.

FIG. 2 is a block diagram which shows circuits embodied in a physical layer of the PCIe device shown in FIG. 1 according to at least one example embodiment of the present inventive concepts. Referring to FIGS. 1 and 2, the PCIe device controller 210 of the PCIe device 200 for supporting a separate reference clock with independent spread spectrum clocking (SSC) (SRIS) that includes the second clock signal generator 205 and a novel PCIe physical layer 250A.

The second clock signal generator 205 generates a second reference clock signal REFCLK_AIC. The physical layer 250A may automatically detect whether the first reference clock signal REFCLK_MB is supplied from the PCIe host 100 or another source, and select one of the first reference clock signal REFCLK_MB and the second reference clock signal REFCLK_AIC as a reference clock signal REFCLK according to, or based on, a result of the detection.

The physical layer 250A may include a transceiver 260, an internal clock signal generator 270, and a reference clock selection circuit 280A according to at least one example embodiment. The transceiver 260 may include a phase locked loop (PLL) circuit 262, a transmitter 264, and a receiver 266, etc., but is not limited thereto.

The PLL circuit 262 may generate a clock signal to be supplied to the transmitter 264 and/or the receiver 266 using a reference clock signal REFCLK. The reference clock signal REFCLK may be the REFCLK_MB clock signal or the REFCLK_AIC clock signal output from the reference clock selection circuit 280A. The reference clock signal REFCLK may be one of the first reference clock signal REFCLK_MB transmitted from the PCIe host 100 and the second reference clock signal REFCLK_AIC generated in the PCIe device 200.

The PLL circuit 262 may generate a new clock signal having a changed frequency based on the reference clock signal REFCLK by multiplying the reference clock signal REFCLK with a desired frequency. For example, the PLL circuit 262 may generate a clock signal with a frequency of 2.5 GHz by multiplying a reference clock signal REFCLK with a frequency of 100 MHz.

The transmitter 264 may convert a parallel data signal to a serial data signal PCIe TX using an output signal of the PLL circuit 262 and transmit the serial data signal PCIe TX to the PCIe host 100 through a first lane 310-1 connected to the receiving section RX of the PCIe host 100 according to at least one example embodiment, but not limited thereto.

The receiver 266 receives a serial data signal PCIe RX transmitted from the PCIe host 100 through a second lane 310-2 connected to the transmitting section TX of the PCIe host 100, and generates a clock signal for restoring the received serial data signal and a clock signal for converting the restored serial data signal into a parallel data signal using an output signal of the PLL circuit 262 according to at least one example embodiment, but not limited thereto.

The reference clock selection circuit 280A may select one of the first reference clock signal REFCLK_MB transmitted from the PCIe host 100, and the second reference clock signal REFCLK_AIC generated in the PCIe device 200, as the reference clock signal REFCLK for an operation of the PCIe device 200. That is, the reference clock selection circuit 280A may automatically determine whether the first reference clock signal REFCLK_MB is supplied from the PCIe host 100, and accordingly transmit the first reference clock signal REFCLK_MB, or use the second reference clock signal generated by the PCIe device 200 and transmit the second reference clock signal REFCLK_AIC to the transceiver 260, according to a result of the determination.

The reference clock selection circuit 280A may include a first counter 281A, a second counter 282A, a comparator 283A, a selector 285, and a clock gating circuit 287, but the example embodiments are not limited thereto.

When the first reference clock signal REFCLK_MB is supplied to the PCIe device 200, the first counter 281A may receive the first reference clock signal REFCLK_MB transmitted from the PCIe host 100, count the number of toggles (or oscillations) of the first reference clock signal REFCLK_MB, and generate a first count value REFCLK_MB_CNT.

The second counter 282A may receive the second reference clock signal REFCLK_AIC generated from the second clock signal generator 205 of the PCIe device 200 (e.g., an internal reference clock generator, a device reference clock generator, etc.), count the number of toggles (or oscillations) of the second reference clock signal REFCLK_AIC, and generate a second count value REFCLK_AIC_CNT.

The first count value REFCLK_MB_CNT and the second count value REFCLK_AIC_CNT may be supplied to the comparator 283A. The comparator 283A may be a logic gate that compares the first count value REFCLK_MB_CNT with the second count value REFCLK_AIC_CNT, generates a clock selection signal CLK_SEL according to a result of the comparison based on desired criteria, and outputs the clock selection signal CLK_SEL to the selector 285. Additionally, the comparator 283A may be a programmable processing device, such as a processor, a CPU, an ASIC, etc., that is configured to generate the clock selection signal CLK_SEL based on the results of a comparison of a plurality of count values associated with a plurality of respective clock signals (e.g., REFCLK_MB_CNT, REFCLK_AIC_CNT, etc.).

The desired criteria for selecting the reference clock signals may be configurable. For example, when a difference between the first count value REFCLK_MB_CNT and the second count value REFCLK_AIC_CNT is smaller than a desired reference value, the comparator 283A may generate a clock selection signal CLK_SEL for selecting the first reference clock signal REFCLK_MB as the reference clock signal REFCLK and output the generated clock selection signal CLK_SEL to the selector 285 according to at least one example embodiment. In other words, the reference clock signal may be selected based on the counts of the toggles and/or oscillations of the two reference clock signals as compared to a desired threshold value.

When a difference between the first count value REFCLK_MB_CNT and the second count value REFCLK_AIC_CNT is larger than the desired reference value, the comparator 283A may generate a clock selection signal CLK_SEL for selecting the second reference clock signal REFCLK_AIC as a reference clock signal REFCLK and output the generated clock selection signal CLK_SEL to the selector 285.

According to another example embodiment, the comparator 283A may be configured to decide a comparison time period between the first count value REFCLK_MB_CNT and the second count value REFCLK_AIC_CNT using an internal clock signal AUXCLK supplied from the internal clock signal generator 270 (e.g., an auxiliary clock signal generator). For example, the comparison time period may be a time period after a certain (e.g., desired) period of time elapses from a reset of the PCIe device 200, and/or a time after a certain desired period of time elapses from the start of an operation of the first counter 281A and/or the second counter 282A.

The comparator 283A may generate a control signal CLKGEN_DIS for controlling whether to generate the second reference clock signal REFCLK_AIC, and may output the control signal CLKGEN_DIS to the second clock signal generator 205. For example, when a difference between the first count value REFCLK_MB_CNT and the second count value REFCLK_AIC_CNT is smaller than a reference value, the comparator 283A may generate a control signal CLKGEN_DIS for powering off the second clock signal generator 205 and output the control signal CLKGEN_DIS to the second clock signal generator 205, but the example embodiments are not limited thereto.

In other words, the control signal CLKGEN_DIS may control the power state of the second clock signal generator (e.g., powered on, powered off, etc.). When the second clock signal generator 205 is powered off according to the control signal CLKGEN_DIS output from the comparator 283A, the power consumption of the PCIe device 200 including the second clock signal generator 205 is reduced.

The selector 285 may transmit one of the first reference clock signal REFCLK_MB and the second reference clock signal REFCLK_AIC to the clock gating circuit 287 in response to and/or based on the clock selection signal CLK_SEL. The selector 285 may be a multiplexor (MUX), or the like, and may be configured to receive a plurality of reference clock signals, such as the clock signals REFCLK_MB, REFCLK_AIC, etc., and may select and/or output one of the reference clock signals based on a clock selection signal (e.g., CLK_SEL).

The clock gating circuit 287 may gate and/or block a supply of the reference clock signal REFCLK to the PLL circuit 262 before the reference clock signal is selected by the selector 285. Accordingly, a supply of an unstable and/or unwanted reference clock signal REFCLK to the PLL circuit 262 is prevented.

Figure 4:
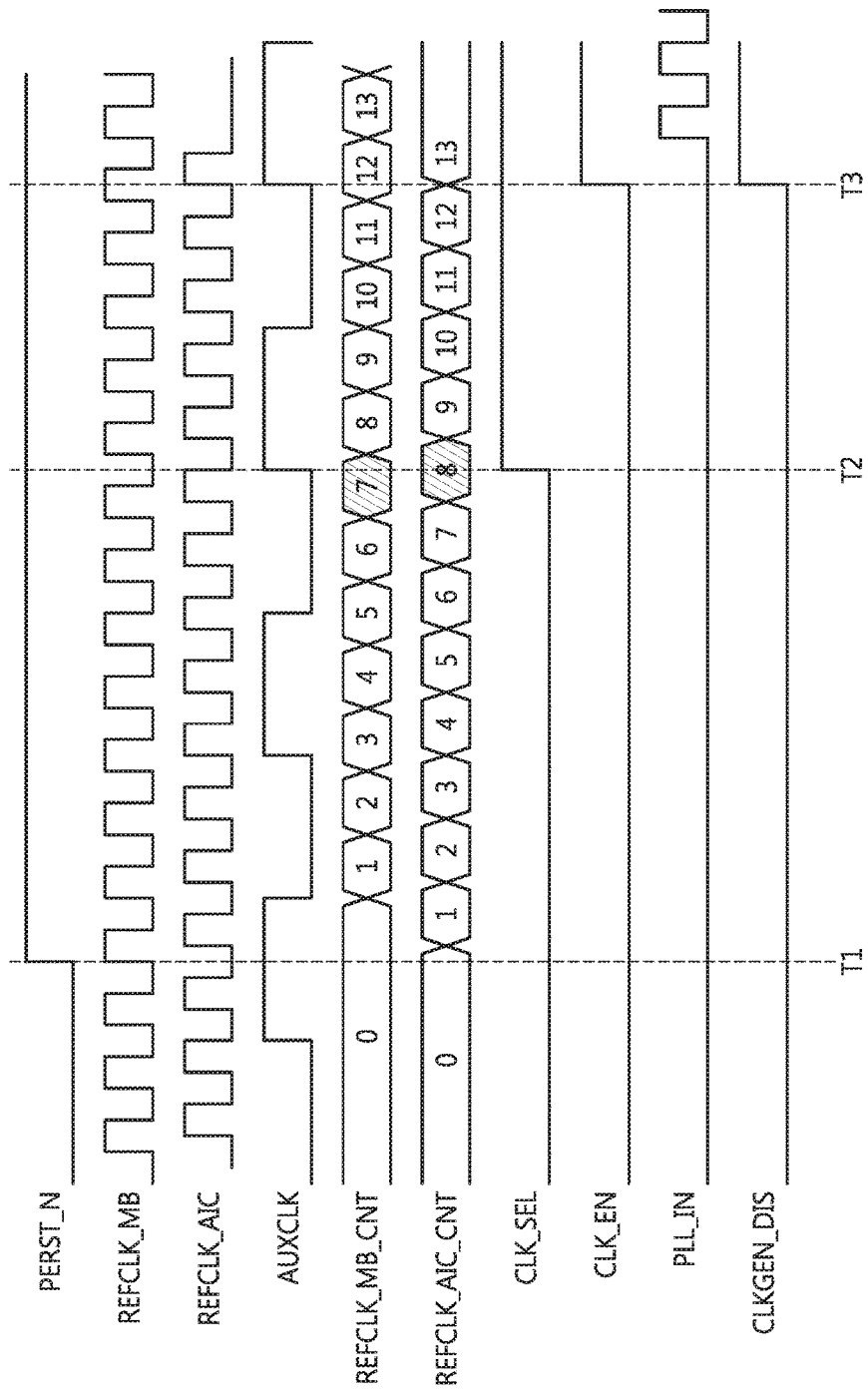
FIG. 4 is a timing diagram which describes an operation of the physical layer shown in FIG. 2 when a first reference clock signal is supplied to the PCIe device of FIG. 1 from the PCIe host device of FIG. 1 according to at least one example embodiment of the present inventive concepts.
Figure 5:
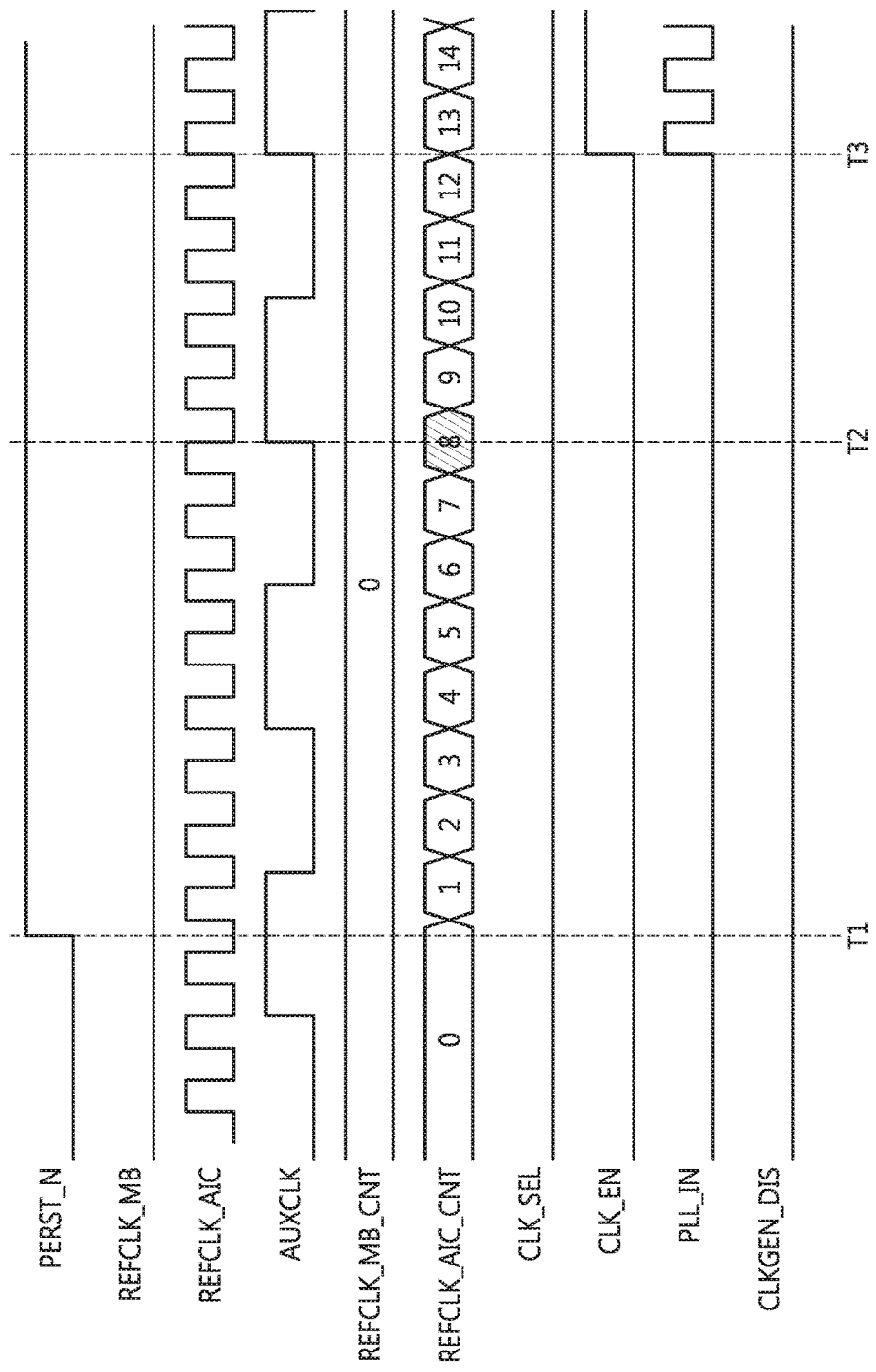
FIG. 5 is a timing diagram which describes an operation of the physical layer shown in FIG. 2 when a first reference signal is not supplied to the PCIe device of FIG. 1 from the PCIe host device of FIG. 1 according to at least one example embodiment of the present inventive concepts.

For example, the clock gating circuit 287 may output the reference clock signal REFCLK output from the selector 285 to the PLL circuit 262 in response to an activated clock enable signal CLK_EN output from the comparator 283A. A timing to activate the clock enable signal CLK_EN according to some example embodiments is shown in FIGS. 4 and 5.

Additionally, the physical layer 250A may also receive a reset signal PERST_N that indicates that the PCIe device 200 is to be reset, according to at least one example embodiment. The reset signal PERST_N will be discussed in more detail in connection with FIG. 4.

Figure 3:
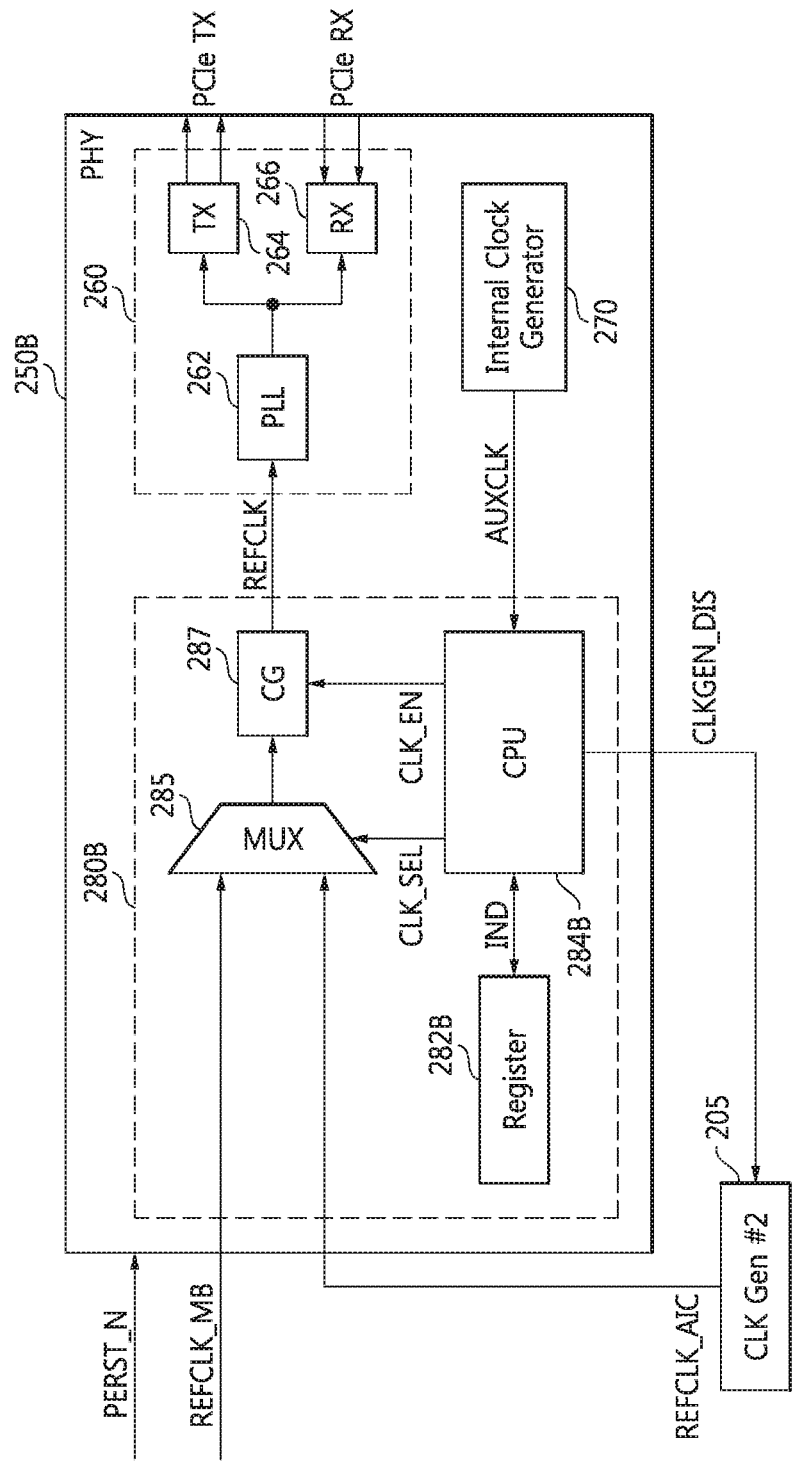
FIG. 3 is a block diagram which shows circuits embodied in a physical layer of the PCIe device shown in FIG. 1 according to at least one example embodiment of the present inventive concepts.

FIG. 3 is a block diagram which shows circuits embodied in the physical layer of the PCIe device shown in FIG. 1 according to some example embodiments of the present inventive concepts. Referring to FIG. 3, the physical layer 250B of the PCIe device 200 may include a transceiver 260, an internal clock signal generator 270, and a reference clock selection circuit 280B according to at least one example embodiment, but is not limited thereto.

The transceiver 260 and the internal clock signal generator 270 shown in FIG. 3 perform the same or similar function as the transceiver 260 and the internal clock signal generator 270 shown in FIG. 2, and thus, specific description of these components will be omitted.

The reference clock selection circuit 280B may select one of the first reference clock signal REFCLK_MB provided from the PCIe host 100 and the second reference clock signal REFCLK_AIC generated in the PCIe device 200, as the reference clock signal REFCLK for operation of the PCIe device 200 in response to (or based on) a clock selection signal CLK_SEL.

The reference clock selection circuit 280B may automatically determine whether the first reference clock signal REFCLK_MB, which is supplied from the PCIe host 100, is selected and transmitted as the reference clock signal, or whether the second reference clock signal REFCLK_AIC, which is generated by the PCIe device 200, is selected and transmitted as the reference clock signal to the transceiver 260 according to a result of the determination.

The reference clock selection circuit 280B may include a register 282B, a CPU 284B, a selector 285, and a clock gating circuit 287. The register 282B may be an environment configuration register for storing information, such as configuration data related to the operation of the PCIe device 200 according to at least one example embodiment. The register 282B may also store indication data IND for selecting a reference clock signal REFCLK of the PCIe device 200. The indication data IND may be data generated by the PCIe core 120 of the PCIe host 100 and stored in the register 282B by the CPU 284B of the PCIe device 200 in at least one example embodiment. That is, the indication data IND transmitted from the PCIe host 100 may be stored in the register 282B.

The indication data IND may include information related to whether the first reference clock signal REFCLK_MB generated by the first clock signal generator 105 of the PCIe host 100 is to be supplied to the PCIe device 200. In other words, the indication data IND provides data indicating which one of the plurality of reference clock signals is to be selected as the reference clock to be used by the PCIe device 200, e.g., whether the REFCLK_MB signal or the REFCLK_AIC signal is used as the reference clock. For example, when the indication data IND indicates a first level (e.g., a high signal or a data value of 1, etc.), it may be represented that the first reference clock signal REFCLK_MB is supplied, or will be supplied, to the PCIe device 200. However, when the indication data IND indicates a second level (for example, a low signal, or data value of 0, etc.), the indication data IND may represent that the first reference clock signal REFCLK_MB is not supplied to the PCIe device 200, and that the second reference clock signal REFCLK_AIC is supplied to the PCIe device 200. However, the example embodiments are not limited thereto and any value may be used by the indication data IND, and the number of reference clock signals may be greater than the two described.

After a link-up (e.g., a connection, etc.) is made between the PCIe host 100 and the PCIe device 200, or after the PCIe device 200 is (physically) connected to the PCIe host 100, etc., the PCIe host 100 may transmit the indication data IND along with a write command to the PCIe device 200 through the PCIe interface 300 (not shown). The CPU 284B of the PCIe device 200 may write the indication data IND to the register 282B in response to the write command according to at least one example embodiment.

The CPU 284B may generally control the operation of the reference clock selection circuit 280B by providing control signals, or the like, for the operation of the reference clock selection circuit 280B. For example, the CPU 284B may read the previously stored indication data IND from the register 282B, and generate a clock selection signal CLK_SEL to be transmitted to the selector 285, and/or a clock enable signal CLK_EN to be transmitted to the clock gating circuit 287, based on the indication data IND.

For example, when the indication data IND read from the register 282B indicates a first level (and/or a first state), the CPU 284B may generate a clock selection signal CLK_SEL and transmit the clock selection signal CLK_SEL to the selector 285 that indicates and/or controls the selector 285 to output and/or select the first reference clock signal REFCLK_MB as the reference clock signal REFCLK.

When the indication data IND read from the register 282B indicates a second level (and/or a second state), the CPU 284B may generate a clock selection signal CLK_SEL and transmit the clock selection signal CLK_SEL to the selector 285 that indicates and/or controls the selector 285 to output and/or select the second reference clock signal REFCLK_AIC as the reference clock signal REFCLK. While only two reference clocks are discussed in connection with the example embodiments, the example embodiments are not limited thereto and there may be a greater number of reference clocks according to other example embodiments.

Based on the level and/or state of the clock selection signal CLK_SEL received by the selector 285, the selector 285 may transmit one of the first reference clock signal REFCLK_MB and the second reference clock signal REFCLK_AIC to the clock gating circuit 287. In other words, the selector 285 selects one of the plurality of reference clock signals based on the state of the clock selection signal CLK_SEL received from the CPU 284B.

The clock gating circuit 287 may gate (and/or block, delay, etc.) a supply of an unstable reference clock signal REFCLK to the PLL circuit 262 before the reference clock signal REFCLK is selected. In other words, the clock gating circuit 287 prevents the transmission of an unstable reference clock signal REFCLK to the transmitter 260.

For example, the clock gating circuit 287 may output the reference clock signal REFCLK output from the selector 285 to the PLL circuit 262 in response to an activated (e.g., enabled, high, selected, etc.) clock enable signal CLK_EN output from the CPU 284B. In other words, the clock gating circuit 287 transmits the selected reference clock signal REFCLK to the transmitter 260 based on a received clock enable signal CLK_EN output from the CPU 284B. Timings to activate each of the clock selection signal CLK_SEL and the clock enable signal CLK_EN according to some example embodiments are shown in FIGS. 4 and 5. In at least one example embodiment, activation may refer to a transition from a second level (e.g., a low value, a "0" value, etc.) to a first level (e.g., a high value, a "1" value, etc.), but is not limited thereto.

Additionally, the physical layer 250B may also receive a reset signal PERST_N that indicates that the PCIe device 200 is to be reset, according to at least one example embodiment. The reset signal PERST_N will be discussed in more detail in connection with FIG. 4.

FIG. 4 is a timing diagram which describes an operation of the physical layer shown in FIG. 2 when a first reference clock signal is supplied to the PCIe device of FIG. 1 from the PCIe host device of FIG. 1 according to at least one example embodiment. Referring to FIGS. 1, 2, and 4, it is assumed that the PCIe host 100 supplies the first reference clock signal REFCLK_MB to the PCIe device 200 through the PCIe interface 300. Accordingly, both the first reference clock signal REFCLK_MB and the second reference clock signal REFCLK_AIC may be supplied to the selection circuit 280A, but the example embodiments are not limited thereto, for example, there may be a greater number of reference clock signals supplied to the selection circuit 280A.

The first reference clock signal REFCLK_MB may be supplied to the first counter 281A and a first input terminal of the selector 285 through the PCIe interface 300 and the connector 202 according to some example embodiments. The second reference clock signal REFCLK_AIC may be supplied to the second counter 281A and a second input terminal of the selector 285 according to some example embodiments.

At a first time T1, a reset of the PCIe device 200 is released (e.g., the PCIe device 200 is reset). When a reset signal PERST_N transits from a low level to a high level, it is assumed in FIGS. 4 and 5 that the reset of the PCIe device 200 is released and/or reset.

When the reset of the PCIe device 200 is released, the first counter 281A and the second counter 282A may perform a count operation starting at the first time T1. For example, the first counter 281A may count the number of first edges (e.g., counting the rising edges of a signal) of the first reference clock signal REFCLK_MB and generate a first count value REFCLK_MB_CNT, but the example embodiments are not limited thereto and other methods of performing the count operation may be used. The second counter 282A may count the number of first edges (e.g., rising edges) of the second reference clock signal REFCLK_AIC and generate a second count value REFCLK_AIC_CNT, but the example embodiments are not limited thereto.

At a second time T2, the comparator 283A may compare the first count value REFCLK_MB_CNT and the second count value REFCLK_AIC_CNT, and/or calculate a difference between the first count value REFCLK_MB_CNT and the second count value REFCLK_AIC_CNT. The comparator 283A may then compare the results of the first comparison with a reference value and/or desired threshold value and generate a clock selection signal CLK_SEL according to a result of the second comparison. A comparison time (for example, T2) of the comparator 283A may be decided based on an internal clock signal AUXCLK and the reference value may be changed if the comparison time is changed according to at least one example embodiment.

Referring to FIG. 4, when a difference between the first count value (e.g., REFCLK_MB_CNT=7) and the second count value (e.g., REFCLK_AIC_CNT=8) is smaller than or equal to a reference value and/or threshold value (for example, N, where N is a natural number larger than 1, for example, 2), the comparator 283A may determine that a frequency of the first reference clock signal REFCLK_MB and a frequency (for example, 100 MHz) of the second reference clock signal REFCLK_AIC are equal to each other and/or are within an error tolerance range. In other words, a difference between the REFCLK_MB_CNT and the REFCLK_AIC_CNT values is calculated and the results of the calculation is compared against a desired threshold value in order to determine whether the frequencies of the respective clock signals are within a desired error tolerance range.

The comparator 283A of FIG. 4 may output an activated (e.g., a high-level signal, a high signal, a "1" value, an enabled signal, etc.) clock selection signal CLK_SEL to the selector 285, and the selector 285 may select one of the reference clock signals based on the activated clock selection signal. In other words, the first reference clock signal REFCLK_MB that is supplied to the first input terminal of the comparator 283A may be output as the reference clock signal REFCLK for the operation of the PCIe device 200 according to the activated clock selection signal CLK_SEL according to at least one example embodiment.

At a third time T3, the comparator 283A may generate an activated clock enable signal CLK_EN so that the first reference clock signal REFCLK_MB may be output (and/or transmitted) to the PLL circuit 262 and the transceiver 260 (which may be represented as the PLL_IN signal) as the reference clock signal REFCLK. The comparator 283A may also output the activated clock enable signal CLK_EN to the clock gating circuit 287.

The comparator 283A may output an activated control signal CLKGEN_DIS to the second clock signal generator 205 to block power of the second clock signal generator 205 (e.g., stop the flow of electricity to the second clock signal generator, etc.). As shown in FIG. 4, the clock enable signal CLK_EN and the control signal CLKGEN_DIS may both be activated (and/or simultaneously activated) according to at least one example embodiment. Accordingly, the second clock signal generator 205 may be powered off to reduce power consumption of the PCIe device 200 and the clock gating circuit 287 may supply the reference clock signal REFCLK=REFCLK_MB to the transceiver 260 and the PLL circuit 262 (which may be represented as the PLL_IN signal) according to at least one example embodiment.

FIG. 5 is a timing diagram which describes an operation of the physical layer shown in FIG. 2 when a first reference signal is not supplied to the PCIe device of FIG. 1 from the PCIe host device of FIG. 1 according to at least one example embodiment. Referring to FIGS. 1, 2, and 5, it is assumed that the PCIe host 100 does not supply the first reference clock signal REFCLK_MB to the PCIe device 200 through the PCIe interface 300. In other words, the PCIe device 200 does not receive the first reference clock signal REFCLK_MB from the PCIe host 100. Accordingly, the second reference clock signal REFCLK_AIC may be the only reference clock signal supplied to the selection circuit 280A.

When the reset signal PERST_N of the PCIe device 200 is released at the first time T1, the first counter 281A and the second counter 282A may perform a count operation starting at the first time T1. For example, the first counter 281A may count the number of rising edges (e.g., leading edges) of the first reference clock signal REFCLK_MB and generate a first count value REFCLK_MB_CNT. The second counter 282A may count the number of rising edges of the second reference clock signal REFCLK_AIC and generate a second count value REFCLK_AIC_CNT.

Since the first reference clock signal REFCLK_MB is not supplied to the PCIe device 200, the first count value REFCLK_MB_CNT is zero according to this example scenario.

At the second time T2, the comparator 283A may compare the first count value REFCLK_MB_CNT and the second count value REFCLK_AIC_CNT and/or calculate a difference between the first count value REFCLK_MB_CNT and the second count value REFCLK_AIC_CNT. The comparator 283A may then compare the results of the calculation with a desired reference value (and/or desired threshold value), and generate the clock selection signal CLK_SEL according to a result of the comparison with the desired reference value.

The comparison time (for example, T2) of the comparator 283A may be decided and/or set based on an internal clock signal AUXCLK, and the desired reference value may vary with a change in the comparison time. In other words, the desired reference value (e.g., desired threshold value) may be based on the set comparison time.

Referring to FIG. 5, since a difference between the first count value (REFCLK_MB_CNT=0) and the second count value (REFCLK_AIC_CNT=8) is 8 and is larger than the desired reference value (for example, N, where N is a natural number larger than 1, for example, 2), the comparator 283A outputs a deactivated (e.g., a low-level, a "0" value, etc.) clock selection signal CLK_SEL to the selector 285. The selector 285 may select a second reference clock signal REFCLK_AIC supplied to a second input terminal as the reference clock signal REFCLK for the operation of the PCIe device 200 according to the deactivated clock selection signal CLK_SEL according to at least one example embodiment.

At the third time T3, the comparator 283A may generate an activated clock enable signal CLK_EN so that the second reference clock signal REFCLK_AIC is output and/or transmitted to the transceiver 260 and the PLL circuit 262 as the reference clock signal REFCLK which may be represented as the PLL_IN signal. Additionally, the comparator 283A may output the activated clock enable signal CLK_EN to the clock gating circuit 287.

The comparator 283A also outputs a deactivated (e.g., a low signal, a "0" value, etc.) control signal CLKGEN_DIS to the second clock signal generator 205 that indicates that the power to the second clock signal generator 205 is not to be blocked. In other words, the comparator 283A transmits a control signal indicating that the power to the second clock signal generator 205 is not to be interrupted.

The second clock signal generator 205 may maintain occurrence of the second reference clock signal REFCLK_AIC in response to the deactivated control signal CLKGEN_DIS, and the clock gating circuit 287 may supply the reference clock signal REFCLK=REFCLK_AIC to the transceiver 260 and the PLL circuit 262 (which may be represented as the PLL_IN signal) in response to the activated clock enable signal CLK_EN according to at least one example embodiment.

Figure 6:
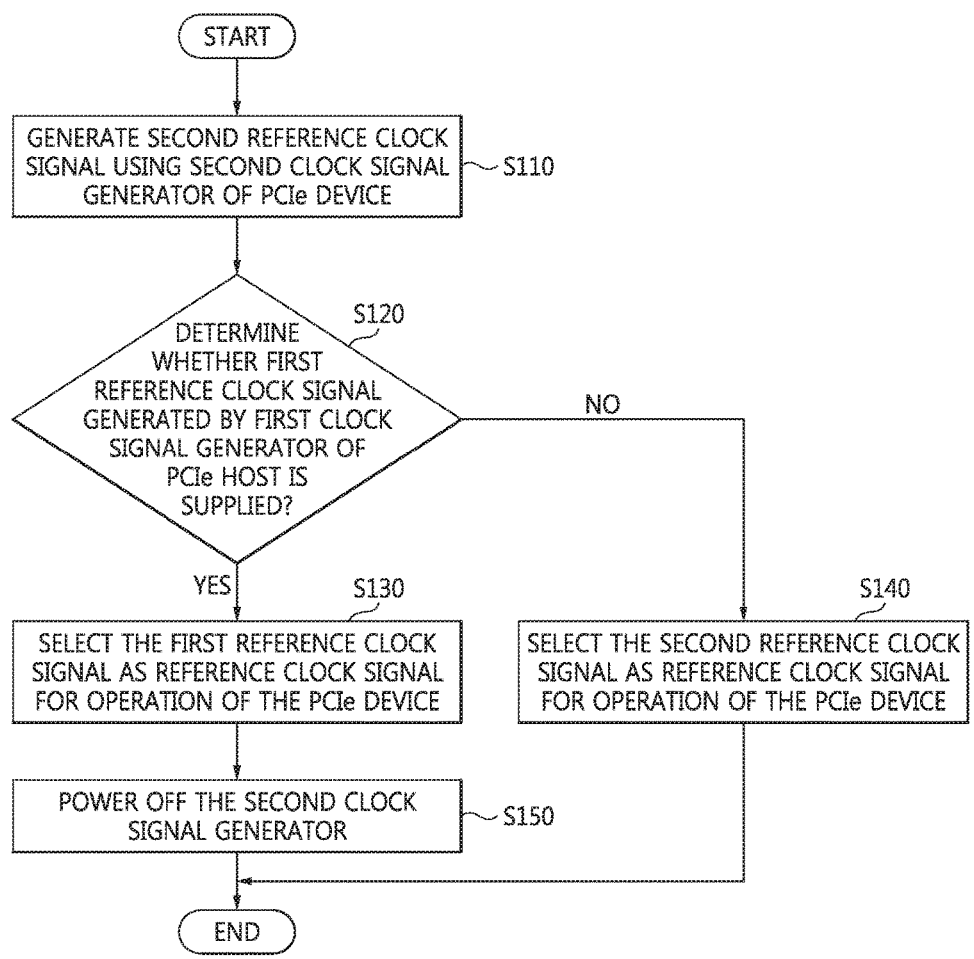
FIG. 6 is a flowchart for describing a method of operating a physical layer of the PCIe device shown in FIG. 2 or 3 according to at least one example embodiment of the present inventive concepts.

FIG. 6 is a flowchart for describing a method of operating a physical layer of the PCIe device shown in FIG. 2 or 3 according to some example embodiments. FIG. 7 is a flowchart for specifically describing a determination step shown in FIG. 6 according to some example embodiments. Referring to FIGS. 1 to 7, when the PCIe host 100 and the PCIe device 200 are connected to each other through the PCIe interface 300, the second clock signal generator 205 of the PCIe device 200 may generate a second reference clock signal REFCLK_AIC and may supply the second reference clock signal REFCLK_AIC to the reference clock selection circuit (e.g., 280A or 280B) (S110).

The reference clock selection circuit (e.g., 280A or 280B) may determine whether the first reference clock signal REFCLK_MB output from the first clock signal generator 105 of the PCIe host 100 is supplied to the PCIe device 200 (S120).

Referring now to FIG. 7, the reference clock selection circuit 280A may count the number of toggles and/or oscillations of the first reference clock signal REFCLK_MB to generate a first count value REFCLK_MB_CNT (S122). The reference clock selection circuit 280A may count the number of toggles and/or oscillations of the second reference clock signal REFCLK_AIC to generate a second count value REFCLK_AIC_CNT (S124). The reference clock selection circuit 280A may calculate the difference between the first count value REFCLK_MB_CNT and the second count value REFCLK_AIC_CNT and compare the calculated difference with a desired reference value (S126).

Based on the result of the comparison step S126, when the difference between the first count value REFCLK_MB_CNT and the second count value REFCLK_AIC_CNT is equal to or smaller than the desired reference value (YES in S120), the reference clock selection circuit 280A may determine that the first reference clock signal REFCLK_MB is supplied to the PCIe device 200, and select the first reference clock signal REFCLK_MB as the reference clock signal REFCLK (S130).

When the first reference clock signal REFCLK_MB is selected as the reference clock signal REFCLK, the second clock signal generator 205 is not necessary and/or required to operate, and therefore the power supplied to the second clock signal generator 205 is stopped and/or blocked (S150).

Alternately, when the difference between the first count value REFCLK_MB_CNT and the second count value REFCLK_AIC_CNT is larger than the desired reference value (NO in S120), the reference clock selection circuit 280A may determine that the first reference clock signal REFCLK_MB is not to be supplied to the PCIe device 200, and selects the second reference clock signal REFCLK_AIC as the reference clock signal REFCLK (S140) according to at least one example embodiment.

The PCIe device for supporting SRIS according to at least one example embodiment of the present inventive concepts may automatically select one of a plurality of reference clock signals output from a plurality of clock sources as an operation clock signal (e.g., a main reference clock signal).

The PCIe device for supporting SRIS according to at least one example embodiment of the present inventive concepts may automatically determine whether a first reference clock signal is supplied to the outside of the PCIe device (e.g., is output to one or more external destinations). The PCIe device may also use one of a plurality of reference clock signals, e.g., the first reference clock signal or a second reference clock signal, which are generated in the PCIe device as an operation clock signal of the PCIe device based on a result of a determination, and thus, when the first reference clock signal is selected as the operation clock signal (e.g., selected as the main reference clock signal), the PCIe device may automatically power off (e.g., power down, shut off, etc.) the clock signal generator that generates the second reference clock signal. Accordingly, power consumption of the PCIe device may be reduced.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

As is traditional in the field of the inventive concepts, various example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar processing devices, they may be programmed using software (e.g., microcode) to perform various functions discussed herein and may optionally be driven by firmware and/or software, thereby transforming the microprocessor or similar processing devices into a special purpose processor. Additionally, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

What is claimed is:

1. A peripheral component interconnect express (PCIe) device for supporting a separate reference clock with independent spread spectrum clocking (SSC) (SRIS), the PCIe device comprising:
   a connector in a structure to be connected to a PCIe host, the connector configured to receive a first reference clock signal from the PCIe host;
   a clock signal generator configured to generate a second reference clock signal; and
   a selection circuit configured to determine whether the first reference clock signal is being supplied through the connector, and
      transmit one of the first reference clock signal and the second reference clock signal to a transceiver based on the determination, and
      in response to the first reference clock signal being supplied to the transceiver, the selection circuit is further configured to output to the clock signal generator a control signal to power off the clock signal generator.

2. The PCIe device of claim 1, wherein the selection circuit includes:
   a register configured to store indication data that indicates whether the first reference clock signal is supplied to the connector;
   a processor configured to generate a selection signal based on the indication data; and
   a selector connected to the connector and the clock signal generator, the selector configured to transmit one of the first reference clock signal and the second reference clock signal to the transceiver based on the selection signal.

3. The PCIe device of claim 1, wherein the selection circuit is further configured to:
   compare a first count value related to the first reference clock signal with a second count value related to the second reference clock signal; and
   transmit one of the first reference clock signal and the second reference clock signal to the transceiver based on a result of the comparison.

4. The PCIe device of claim 3, further comprising:
   an internal clock signal generator configured to generate an internal clock signal; and
   wherein the selection circuit is configured to set a comparison time between the first count value and the second count value based on the internal clock signal, and
      compare the first count value and the second count value at the comparison time.

5. The PCIe device of claim 4, wherein the selection circuit is configured to:
   transmit the first reference clock signal to the transceiver in response to a difference between the first count value and the second count value being smaller than a desired reference value at the comparison time; and
   transmit the second reference clock signal to the transceiver in response to the difference between the first count value and the second count value being equal to or greater than the desired reference value at the comparison time.

6. The PCIe device of claim 1, wherein the selection circuit includes:
   a first counter configured to count toggles of the first reference clock signal to generate a first count value;
   a second counter configured to count toggles of the second reference clock signal to generate a second count value;
   a comparator configured to compare the first count value with the second count value, and generate a selection signal according to a result of the comparison; and
   a selector configured to select one of the first reference clock signal and the second reference clock signal according to the selection signal, and
      transmit the selected clock signal to the transceiver.

7. The PCIe device of claim 6, further comprising:
   an internal clock signal generator configured to generate an internal clock signal; and
   wherein the comparator is configured to
      set a comparison time between the first count value and the second count value using the internal clock signal,
      compare the first count value with the second count value at the comparison time, and
      generate the selection signal.

8. The PCIe device of claim 7, wherein the selection circuit further includes a clock gating circuit connected to the selector and the transceiver; and wherein the comparator is configured to generate a clock enable signal that disables the clock gating circuit until the selection signal is received.

9. The PCIe device of claim 8, wherein the comparator is configured to:

generate the selection signal to select one of the first reference clock signal and the second reference clock signal;

generate the clock enable signal to enable the clock gating circuit; and generate a control signal to power off the clock signal generator.

10. The PCIe device of claim 1, wherein the transceiver and the selection circuit are formed on a physical layer of the PCIe device; and the PCIe device is an expansion card which is adapted to being inserted into an expansion slot on a motherboard of the PCIe host using the connector.

11. A peripheral component interconnect express (PCIe) device for supporting separate reference clocks with independent spread spectrum clocking (SSC) (SRIS), the separate reference clocks including a first reference clock signal from a PCIe host and a second reference clock signal from the PCIe device, the PCIe device comprising:

a clock signal generator configured to generate the second reference clock signal; and a physical layer configured to, automatically detect whether the first reference clock signal is supplied from the PCIe host, select one of the first reference clock signal and the second reference clock signal as a main reference clock signal of the PCIe device according to a result of the detection, and automatically power off the clock signal generator in response to the first reference clock signal being selected as the reference clock signal.

12. The PCIe device of claim 11, wherein the physical layer includes:

a register configured to store indication data that indicates whether the first reference clock signal is supplied;

a processor configured to generate a selection signal based on the indication data; and a selector configured to select one of the first reference clock signal and the second reference clock signal as the main reference clock signal in response to the selection signal.

13. The PCIe device of claim 11, wherein the physical layer includes a first counter configured to count toggles of the first reference clock signal to generate a first count value;

a second counter configured to count toggles of the second reference clock signal to generate a second count value;

an internal clock signal generator configured to generate an internal clock signal;

a comparator configured to decide a comparison time between the first count value and the second count value based on the internal clock signal, compare the first count value with the second count value at the comparison time, and generate a selection signal based on the comparing of the first count value and the second count value; and a selector configured to select one of the first reference clock signal and the second reference clock signal as the main reference clock signal based on the selection signal.

14. A peripheral component interconnect express (PCIe) device for supporting a plurality of clock signals, comprising:

a device clock generator configured to generate a device clock signal;

a selection circuit configured to receive a plurality of clock signals, the plurality of clock signals including an external clock signal received from a PCIe host and the device clock signal, generate a result based on the plurality of clock signals, transmit a reference clock signal based on the generated result, the reference clock signal being selected from the plurality of clock signals, and in response to the external clock signal being selected as the reference clock signal, output to the device clock signal generator a control signal to power off the device clock signal generator; and a transceiver configured to communicate PCIe data to another PCIe device using the transmitted reference clock signal.

15. The PCIe device of claim 14, wherein the selection circuit is configured to generate the result based on the plurality of clock signals by:

calculating a difference between a number of toggles of the external clock signal and a number of toggles of the device clock signal;

generating a result based on the calculated difference and a desired reference value; and selecting one of the external clock signal and the device clock signal based on the generated result of the calculated difference and the desired reference value.

16. The PCIe device of claim 15, wherein the selection circuit includes a processing device and a selector;

the processing device is configured to, transmit a clock selection signal to the selector, the clock selection signal based on the generated result of the calculated difference and the desired reference value; and transmit a power control signal to the device clock generator based on the clock selection signal, the power control signal indicating a power state of the device clock generator.

17. The PCIe device of claim 16, wherein the selector is a multiplexor, and the selector is configured to receive the plurality of clock signals;

receive the clock selection signal; and output the reference clock signal to the transceiver.

18. The PCIe device of claim 14, wherein the PCIe host is installed on a motherboard.

* * * * *